United States Patent [19]

Gioutsos et al.

[11] Patent Number: 5,282,134
[45] Date of Patent: Jan. 25, 1994

[54] SLANT TRANSFORM/SIGNAL SPACE CRASH DISCRIMINATOR

[75] Inventors: Tony Gioutsos, Brighton; Jace L. Allen, Farmington Hills, both of Mich.

[73] Assignee: Automotive Systems Laboratory, Inc., Farmington Hills, Mich.

[21] Appl. No.: 746,882

[22] Filed: Aug. 19, 1991

[51] Int. Cl.$^5$ .................. G06F 7/70; B60R 21/32
[52] U.S. Cl. .................. 364/424.05; 364/424.01; 180/274
[58] Field of Search ............ 364/424.05; 180/232, 180/271, 282; 280/728, 734, 735; 340/478, 436

[56] References Cited

U.S. PATENT DOCUMENTS

| | | | |
|---|---|---|---|
| 3,911,391 | 10/1975 | Held et al. ................ | 180/103 |
| 4,381,829 | 3/1983 | Montaron ................ | 180/274 |
| 4,418,388 | 11/1983 | Allgor et al. ............ | 364/431.01 |
| 4,487,476 | 12/1984 | Hester et al. ............ | 350/162.13 |
| 4,860,357 | 8/1989 | Avery ..................... | 364/728.07 |
| 4,929,954 | 5/1990 | Elleaume ................ | 342/194 |
| 4,984,247 | 1/1991 | Kaufmann et al. ..... | 375/1 |
| 4,994,972 | 2/1991 | Diller ..................... | 364/424.05 |
| 5,007,101 | 4/1991 | Iwahashi et al. ........ | 382/42 |
| 5,036,467 | 7/1991 | Blackburn et al. ...... | 364/424.05 |
| 5,065,322 | 11/1991 | Mazur et al. ............ | 364/424.05 |
| 5,067,745 | 11/1991 | Yoshikawa ............. | 280/735 |
| 5,073,860 | 12/1991 | Blackburn et al. ...... | 364/424.05 |
| 5,081,587 | 1/1992 | Okano .................... | 364/424.05 |
| 5,109,341 | 4/1992 | Blackburn et al. ...... | 364/424.05 |

OTHER PUBLICATIONS

Principles of Communication Engineering, John M. Wozencraft & Irwin Mark Jacobs—1967, pp. 223-237.
"Electronic Sensing of Automobile Crashes for Airbag Deployment"; Robert W. Diller; SAE Paper 910276, Feb. 1991, pp. 65-68.
"Electronic Crash Sensors for Restraint Systems"; Dietrich E. Bergfried et al., SAE Paper 901136, pp. 169-177, no date.

Primary Examiner—Thomas G. Black
Assistant Examiner—Tan Q. Nguyen
Attorney, Agent, or Firm—Lyon & Delevie

[57] ABSTRACT

A system and method for triggering a vehicle safety device in response to a crash or sudden vehicle deceleration includes conversion of an analog signal generated by an acceleration sensor and representative of instantaneous vehicle acceleration to a digital value and using a ROM lookup table to determine its natural log. An autocorrelation of the log values of the acceleration data is determined and thereafter used to calculate first and second basis vector values. A safety device trigger signal is generated by a signal space discriminator when a value calculated from the first and second basis vector values exceeds a threshold value therefor.

19 Claims, 2 Drawing Sheets

SLANT TRANSFORM/SIGNAL SPACE CRASH DISCRIMINATOR

BACKGROUND OF THE INVENTION

The instant invention relates to an acceleration-responsive system and method for triggering vehicle safety devices such as air bags that operate to protect vehicle passengers in the event of a crash or sudden vehicle deceleration.

The prior art teaches a variety of systems and methods for sensing a vehicle crash or sudden vehicle deceleration and deploying a vehicle safety device such as an air bag, or locking a seat belt, or actuating a pretensioner for a seat belt retractor. Typically, the safety device is triggered or otherwise deployed into its protective position when the system detects an impact or deceleration exceeding a threshold value therefor. One such "physically-based" prior art method of crash detection using an electronic acceleration sensor integrates the output thereof over time and compares the result against a threshold velocity. One problem with the integration method of crash detection is that the crash severity cannot be determined early enough for high-speed angular, partial barrier, or pole crashes. Moreover, the wide "grey area" between "fire" and "no-fire" conditions for low-speed crash conditions often results in an inadvertent deployment of the safety device when deployment is unnecessary, or a non-deployment of the safety device when deployment is necessary. Additionally, the safety device often will not be activated during low speed crashes and will not be activated instantaneously or quickly enough to prevent injury during high speed frontal crashes or for pole or offset crashes.

A second known method of crash detection using an electronic sensor attempts to deemphasize the use of simple velocity calculations and instead measure the energy dissipated during a crash to assess the crash. However, this "energy method" still utilizes velocity information, resulting in the same types of deployment problems and slow response time encountered with the integration method. Additionally, the energy method has a further limitation of detection capability in that it is accurate only over short time intervals.

Another known method of crash detection uses in combination a jerk algorithm indicative of rate of change of vehicle deceleration with a second algorithm indicative of vehicle deceleration itself. A unanimous vote under both algorithms is required to trigger the safety device. Unfortunately, the requirement of unanimity of decision can prevent activation of the safety device if the vehicle crash involves the collision of a vehicle against the side structure of another vehicle.

SUMMARY OF THE INVENTION

It is an object of the instant invention to provide a system and method of crash detection which triggers a safety device in the event that the magnitude of a vehicle crash or sudden vehicle deceleration exceeds a threshold level.

Another object of the instant invention is to provide a prediction-based method of crash detection superior to the physically-based methods found in the prior art.

A further object of the instant invention is to provide a method of crash detection which obviates the need for a time-varying threshold keyed to the start of the crash.

The instant system for triggering deployment or actuation of a vehicle safety device as in the event of a vehicle crash or sudden vehicle acceleration (deceleration) comprises a sensor mounted in the vehicle for generating an analog signal representative of instantaneous vehicle acceleration (deceleration); means for converting the analog acceleration signal to digital acceleration data; means for transforming the acceleration data to a signal space vector; and signal space discriminator means responsive to the signal space vector for triggering the safety device when a value calculated from the signal space vector exceeds a threshold value therefor. The means for transforming the acceleration data into a signal space vector preferably includes means for obtaining log values of the acceleration data, such as a ROM lookup table; means for determining a correlation function of the log values of the acceleration data; and means, such as a match filter, for calculating first and second basis vector values from the log-correlation function for use in the signal space discriminator.

In the preferred embodiment of the instant system, the means for determining a log-correlation function of the acceleration data includes a summation dependent on current sample time and lag, since the correlation function dominates the determination of whether to trigger the safety device. The first basis vector value calculated from the log-correlation function is preferably a DC vector value, and the second basis vector value is preferably a slant-up vector value going from a negative value to a positive value. Additionally, the means for calculating the first and second basis vector values preferably includes a match filter. Filtering, averaging, and smoothing techniques are preferably also used to reduce the effects of noise, thereby reducing the likelihood of inadvertent deployment of the safety device.

The instant method for triggering a vehicle safety device comprises the steps of obtaining an analog signal representative of vehicle acceleration (deceleration) from an acceleration sensor; converting the analog acceleration (deceleration) signal to digital acceleration data; transforming the digital data to a signal space vector; and triggering the safety device when a value calculated from the signal space vector exceeds a threshold value therefor.

The step of transforming the digital data into a signal space vector preferably includes the steps of obtaining log values of the digital data, as with a ROM lookup table; determining an autocorrelation of the log values using a lag; and match filtering the log-correlation. The step of determining the autocorrelation may include a summation dependent on current sample time and lag. Moreover, the resulting signal space vector is preferably defined in part by the DC vector value of the digital acceleration data, and by the slant-up vector value of the digital data, going from a negative value to a positive value. The analog acceleration signal from the sensor is also preferably clipped prior to its conversion to digital form.

BRIEF DESCRIPTION OF THE DRAWINGS

FIG. 5 is a diagrammatic schematic for a circuit implementing the embodiment shown generally in FIG. 4.

DETAILED DESCRIPTION OF THE PREFERRED EMBODIMENT OF THE INVENTION

Figure 1A:
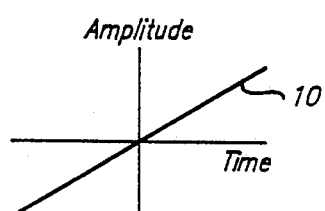
FIGS. 1A through 1C illustrate a slant-up input signal and two of its correlation functions.

The system and method of the instant invention capitalizes on the premise that a correlated signal and an uncorrelated signal are easily distinguished by comparing their respective correlation functions and, further, that even correlated signals can be distinguished by their correlation functions. Moreover, multiplicative noise may be distinguished from the actual crash pulse by autocorrelating the log values of the data generated by an acceleration sensor, thereby providing a system and method of crash discrimination featuring increased reliability and decreased response time.

Specifically, the analog time, generic definition of the auto-correlation function $R_x$ of a random variable x is:

$$R_x(t_1, t_2) = E[X(t_1), x(t_2)], \quad (1)$$

where E is the expected value, $t_1$ and $t_2$ are the first and second points of time, respectively, and $x(t_i)$ is the random variable x at time $t_i$. When applied to discrete time intervals, the autocorrelation function $R_x$ becomes:

$$R_x(n_1, n_2) = E[X(n_1), X(n_2)], \quad (2)$$

for all sample times n. Moreover, a signal x is said to be wide-sense stationary ("WSS") if:

$$R_x(n_1, n_2) = R_x(n_2 - n_1) = R_x(N) = E[X(n)X(n+N)] \quad (3)$$

where lag N is the time lag between the two sampled times n and n+N. The implication of a WSS signal is that the same correlation function will be obtained, irrespective of the time n at which the signal is sampled, as only the lag N is relevant to its determination.

Using the definition of expectation, equation (3) may be expanded to obtain:

$$R_x(N) = \lim_{L \to \infty} \sum_{k=-L}^{L} x(n+k)x(n+k+N), \quad (4)$$

for all sample times n and lag times N, where L is the correlation window length, and k is the current sample time. Ideally, one would look at the signal for an infinite time in order to obtain the exact correlation function for either a WSS signal or a non-WSS random variable, as indicated by equation (4). However, such an approach is impractical for prediction-based crash detection. Thus, the instant invention estimates the correlation function $R_x$ by truncating the limit on the expectation while using the non-WSS definition of correlation, thereby obtaining the following:

$$\hat{R}_x(n_1, n_2) = \frac{1}{2L} \sum_{k=-L}^{L} x(n_1+k)x(n_2+k), \quad (5)$$

for $-L \leq (n_2 - n_1) \leq L$. Moreover, equation (5) can be rewritten as:

$$\hat{R}_x(n, N) = \frac{1}{2L} \sum_{k=-L}^{L} x(n+k)x(n+k+N), \quad (6)$$

for all $-L \leq N \leq L$. Thus, the estimate of the correlation function depends solely on the current sample time n and the lag N. Finally, the correlation function for current time sample n is estimated by calculating its zeroth lag value by adding the multiplied pairs of samples around sample n, from sample n−N to sample n+N.

With respect to prediction-based crash detection in accordance with the instant invention, an acceleration signal corresponding to the early portion of a vehicle crash or sudden vehicle deceleration approximates a slant-up function, with such a signal typically assumed to be a haversine pulse starting at zero G and increasing to higher G values. To maximize occupant safety, a crash must be detected during its initial stages, i.e., while the acceleration signal resulting therefrom is still increasing.

Figure 1B:
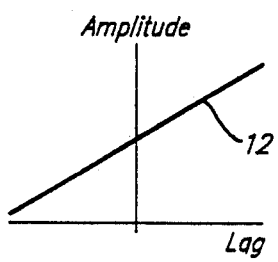
Figure 1C:
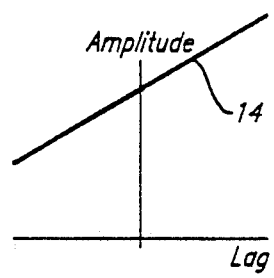
Figure 2A:
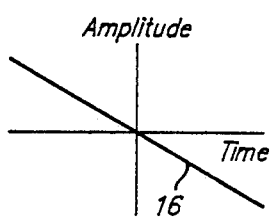
FIGS. 2A through 2C illustrate a slant-up input signal and two of its correlation functions.
Figure 2B:
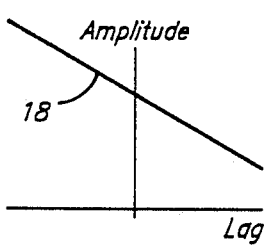
Figure 2C:
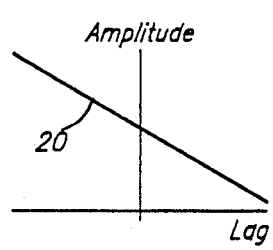

Referring to the drawings, a plot of a slant-up input signal 10 is illustrated in FIG. 1. The correlation function 12 for the slant-up signal 10, plotted as amplitude versus lag at a time t, with t being equal to zero, is illustrated in FIG. 1B. Similarly, the slant-up signal's correlation function 14, plotted as amplitude versus lag at a time t, where t is equal to any positive value, is shown in FIG. 1C. FIGS. 2A through 2C likewise show a slant-down input signal 16, and its respective correlation functions 18 and 20. Thus, it may be said that a slant-up input signal has a slant-up correlation function, and a slant-down input signal has a slant-down correlation function. It is noted that the correlation functions 12, 14, 18, and 20 of FIGS. 1B, 1C, 2B, and 2C, respectively, are non-stationary, as the sample time n is equal to zero; if the sample time n was equal to a value other than zero, a different correlation function would be obtained.

Since the correlation function of a slant-up signal is also a slant-up, as seen in FIGS. 1A through 1C, only the slant-up correlation functions need be examined in order to detect a crash or sudden vehicle deceleration requiring deployment of the air bag. Consequently, slant-down and constant-level correlated and uncorrelated signals are no longer of interest. Moreover, since the correlation function of almost all noise is a spike, correlated noise is easily distinguished from the slant-up function corresponding to a crash pulse.

High-frequency multiplicative noise, as might be generated during a crash due to vehicle construction, crash type, and/or rough road, may also be removed from the sensor's output signal by obtaining log values associated with the signal's instantaneous amplitude and low-pass filtering the resulting log values. Thus, correlating the log values of the acceleration data under the instant invention further serves to distinguish noise from the underlying crash pulse. It will be appreciated that the analog signal representative of instantaneous vehicle acceleration from an acceleration sensor may preferably be clipped at a value of 1 G prior to its digitalization for purposes of autocorrelation. Clipping the signal may add a multiplicative noise term, which noise term may likewise be separated from an underlying crash pulse under the instant invention by obtaining log values associated with the signal's instantaneous amplitude and low-pass filtering the resulting log values.

For purposes of determining the log-correlation of the acceleration data under the instant invention, the current sample time n may be considered to be fixed. A log-correlation function w(n,N) can therefore be determined using the following:

$$w(n, N) = \sum_{k=-L}^{L} \begin{pmatrix} \log[ah(n + k)] \log[ah(n + N)] + \\ \log[ah(n + k)] \log[m(n + N) + 1] + \\ \log[ah(n + N)] \log[m(n + k) + 1] + \\ \log[m(n + N) + 1] \log[m(n + k) + 1] \end{pmatrix} \quad (7)$$

where N is the time lag of the correlation function; a is the amplitude of the crash pulse; h(n) is the crash pulse shape which the instant algorithm is attempting to detect; and m(n) is independently identically distributed noise.

As noted hereinabove, the first term in equation (7) is the log-correlation of a slant-up function which will approximate a slant-up. The second and third terms represent the log-correlation of the sum of the slant-up function and multiplicative noise, both of which terms in general do not look like a slant-up. The fourth term is the log-correlation of the multiplicative noise which does not look like a slant-up. As such, only the first term in equation (7) is relevant to crash detection. Since the underlying crash pulse is assumed to be of a low frequency, the three multiplicative noise terms may be removed with a low-pass filter (not shown). It will be appreciated that such a low-pass filter may be incorporated in the match filter subsequently used for transforming the log-correlation output to a signal-space value, as will be more fully described hereinbelow.

From the foregoing, and assuming that h(n)=n, i.e., that the crash pulse approximates a slant-up function, the log-correlation correlation w(n,N) associated with the acceleration data may be estimated as follows:

$$w(n, N) = \sum_{n=-L}^{L} \log[a(n + k)] \log[a(n + N)] \quad (8)$$

While the function described by equation (8) does not in general look like a slant-up function, it has the characteristics of a slant-up function when viewing the acceleration data in relatively small groups, e.g., perhaps fifteen samples for a given correlation window length L.

A slant transform, as might be implemented using a match filter, is used to find pertinent basis values of the log-correlation function approximated by equation (8). Specifically, for prediction-based crash detection under the instant invention using a slant transform, only two basis vectors are needed to find the slant-up values: the first pertinent basis vector is the DC vector and the second pertinent basis vector is the slant up vector going from negative to positive value. All other basis vectors of the log-correlation function are orthogonal to these two basis vectors and, hence, are not pertinent to calculation of the necessary slant-up values. If the matched filter is a slant-up type signal, then a triangle-type signal, e.g., one that would match the shape of uncorrelated noise, is orthogonal to the slant-up basis vector. Thus, an uncorrelated signal will create no value in the slant-up signal dimension. It is noted that the above slant transform also accomplishes the low-pass filtering of the log-correlation required to remove high-frequency multiplicative noise, inasmuch as both basis vectors are themselves low-pass signals.

Figure 3:
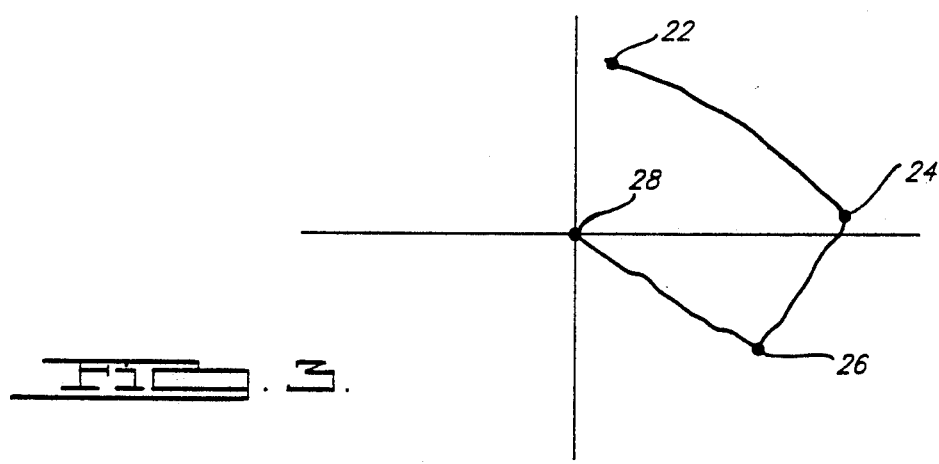
FIG. 3 depicts the movement of crash signal space values.

FIG. 3 shows the movement of a signal space value for a typical vehicle crash, with the above-described first basis vector value being measured along the horizontal axis and the above-described second basis vector value being measured along the vertical axis. As seen in FIG. 3, the general trend for vehicle crashes is to start out at point 22 with a high second basis vector value and a low first basis vector value. At a point 24 midway through the crash, the first basis vector value becomes high and the second basis vector value becomes low. During the second half of the crash, designated by point 26 in FIG. 3, the first basis vector value begins to decrease. And finally, when the crash is over both the first and second basis vector values are near zero, illustrated by point 28 in FIG. 3. Moreover, points with greater first and second basis vector values in general represent crashes of greater severity. Significantly, rough road and smaller severity crashes may produce a few points similar to a larger crash. Thus, consideration of sample number or time, i.e., parameter k above, must be added to help distinguish these conditions from a crash requiring deployment of the air bag.

The resulting first and second basis vector values are used at a signal space discriminator to discriminate between acceleration data indicating deployment of the air bag, and acceleration data indicating that air bag deployment is either unnecessary or undesirable. Reference to FIG. 3 indicates that the crash in a signal space changes its angle relative to time. If "detector vectors" are placed at certain angles, then the degree of sameness between the changing signal vector and any of the detector vectors may be determined by taking the dot product therebetween. If the signal vector has a low DC value and a high slant-up value, then a detector vector near 90° will produce a large dot product. A larger DC value combined with a larger slant-up value, as might be generated during a high MPH crash, will likewise produce a large dot product. Thus, analysis of the dot products between the signal vector and various detector vectors permits differentiation between crashes.

The signal space discriminator preferably includes an integrator to factor in the time variable: while both a high MPH crash and rough road (low-frequency) noise will have a low DC value and a high slant-up value, the signal vector for noise will not maintain a high slant-up value for very long. Thus, integrating the dot products over time permits further discrimination between low-frequency noise and an actual vehicle crash requiring deployment of the air bag. Preferably, an accumulator stores the sum of the dot products of the signal vector with each detector vector. Each sum is then compared to its respective nontime-varying threshold, each of which is tailored to correspond to a different crash profile, given the particular vehicle and the location of the acceleration sensor within the vehicle. When a given threshold is exceeded, the signal space discriminator outputs a trigger signal to deploy the air bag. Thus, the signal space discriminator fires the air bag if it determines that the vehicle is experiencing a crash of sufficient magnitude to require its deployment.

Ideally, if a detector vector is placed at 90° relative to the plot shown in FIG. 3, the accumulator will contain a value of zero whenever a set of data is obtained that begins at zero and returns to zero. However, this will likely not be the case due to quantizer effects and the use of the natural logarithm, and any other detector vector in the first quadrant will likely have some positive value after the data returns to zero. Accordingly, a constant value, or "scale factor", is preferably subtracted from each dot product before accumulating, thereby producing negative dot products for small values so as to reduce the dot product sum with time. Thus, for the above example, when the dot product returns to zero, the accumulator will begin to lose its value as new zero G samples are obtained. The accumulator must not be permitted to go below zero, however.

The detector vectors must be chosen to produce the desired firing times for each of the various types of crashes. For example, a detector vector with a large angle is preferred for detecting the high MPH crashes which require early deployment of the air bag. Poles and offsets are preferably detected using detector vectors with a medium angle. Low MPH crashes are preferably detected using detector vectors having small angles. The specific number of detector vectors to be employed with the signal space discriminator, the scale factor to be subtracted from each the dot product prior to its accumulation, and the thresholds are dependent upon vehicle structure and the location of the acceleration sensor within the vehicle.

Figure 4:
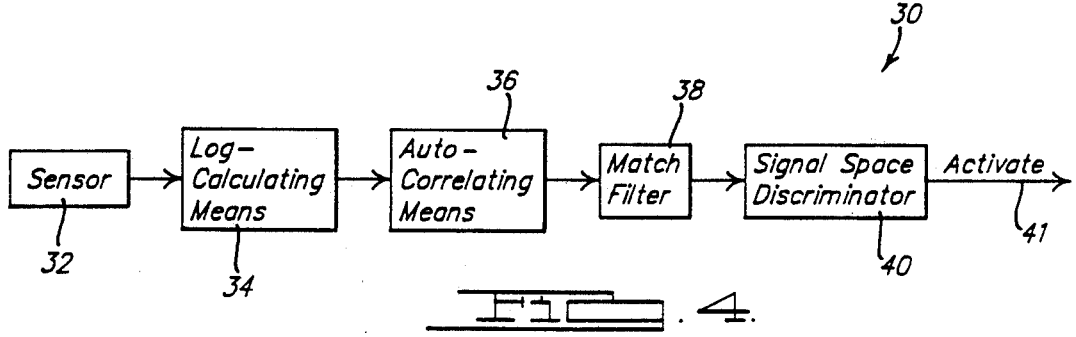
FIG. 4 is a general schematic of an exemplary embodiment of the instant invention.
Figure 2:
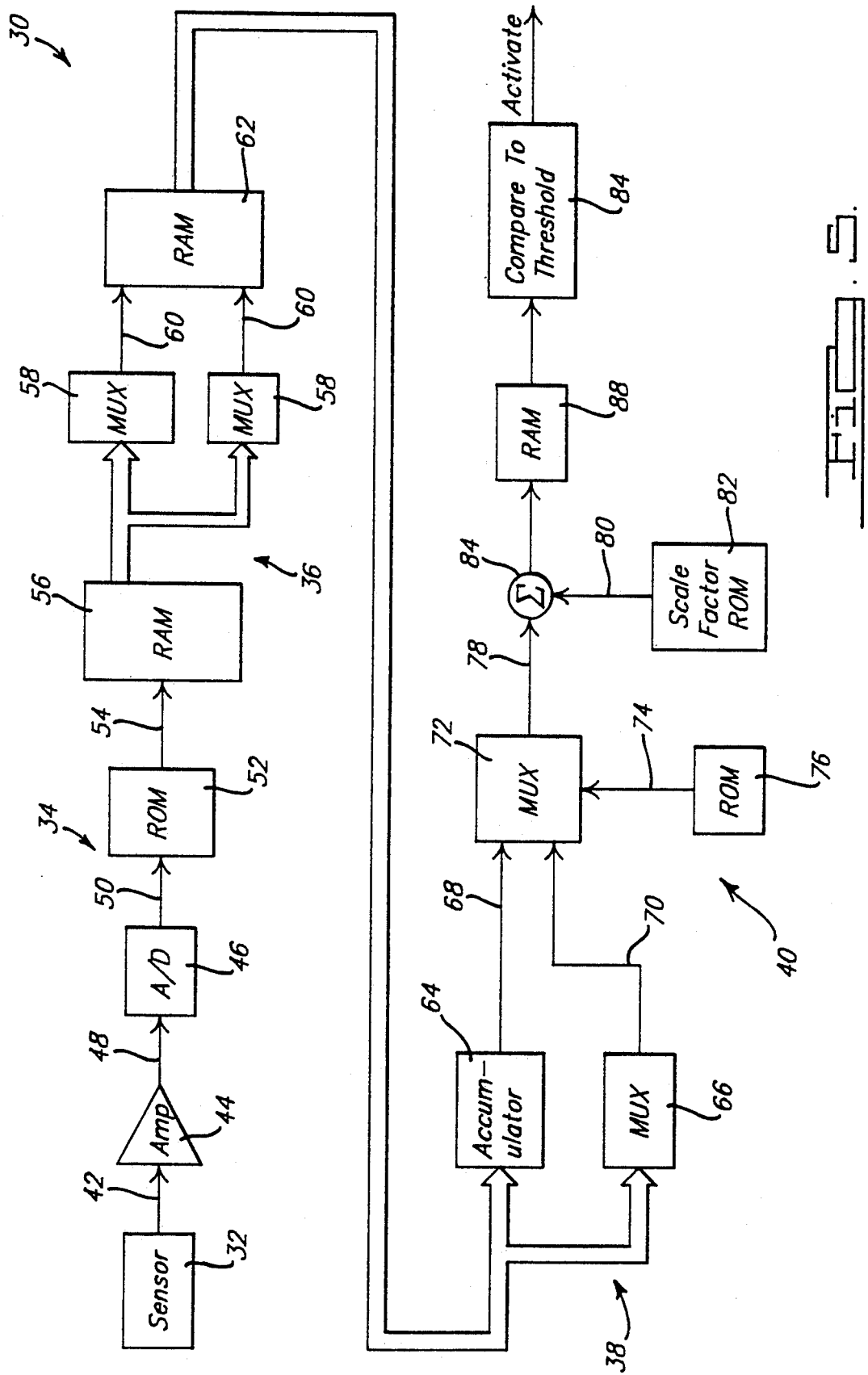

An exemplary system 30 constructed in accordance with the instant invention is generally described in FIG. 4. An acceleration sensor 32 generates an analog signal representative of instantaneous vehicle acceleration. The analog signal, which is preferably measured in G's, is converted to a stream of digital acceleration data and then supplied to log-calculating means illustrated by block 34, where the natural log value of the acceleration data is obtained. The autocorrelation of the resulting log values of the acceleration data is determined at autocorrelation block 36 as described hereinabove. The resulting log-correlation is match filtered at match filter 38 to obtain the basis values pertinent to crash detection. The pertinent basis values are applied to a signal space discriminator 40 which generates a trigger signal 41 for deploying the air bag when the signal space value corresponding to the pertinent basis values exceeds a threshold value therefor.

The exemplary system 30 of FIG. 4 is described in more detail in FIG. 5. Specifically, the analog output signal 42 generated by the acceleration sensor 32 is first amplified at amplifier 44 before being input to an analog-to-digital converter 46, where the amplified analog signal 48 is converted to digital acceleration data 50. Any signal 42 less than 1 G is clipped, i.e., assigned a value of 1 G, by the amplifier 44. Stated another way, the signal 42 is multiplied by a different value depending on its strength, which method step adds a "multiplicative noise" term to the original signal. Additional multiplicative noise may be present in the sensor's original analog output signal 42 due to the crash itself, i.e., the impact of the crash can cause the resulting sensor output to be multiplied by noise terms due to the car construction, crash type, and rough road.

In order to separate high-frequency multiplicative noise from the typically low-frequency crash signal, the acceleration data 50 output by the analog-to-digital converter 46 is used to address a ROM lookup table 52 containing the natural log value associated with each digital acceleration value 50. Since the log of a low-frequency signal retains its low-frequency content, and the log of a high-frequency signal retains its high-frequency content, high-frequency multiplicative noise may be separated from the crash signal with a low-pass filter. However, additional steps are required to separate low-frequency multiplicative noise from the low-frequency crash signal. Thus, the natural log values 54 of the acceleration data 50 provided by ROM 52 are used to determine a log-correlation of the acceleration data 50 at the autocorrelating means indicated generally by reference number 36.

In order to calculate the autocorrelation function for time sample n, it's zeroth lag value is calculated by adding the multiplied pairs of samples around sample n, from sample n-N to sample n+N. The autocorrelation of the acceleration data 50 is taken using a lag of up to ±N.

The subsequent slant transform operation, which may also be referred to as a match filtering function in the instant embodiment, is indicated generally by reference number 38. The slant transform, or match filter, transforms the log-correlation of the acceleration data to a signal space value which can be input to a signal space discriminator, indicated generally by reference number 40. Specifically, the log values 54 of the acceleration data 50 output at ROM 52 are applied to a RAM 56 which then supplies them to multiplexers 58. The multiplexers 58 in turn output values 60 which are stored in RAM 62 and applied to an accumulator 64 and a multiplexer 66. The accumulator 64 outputs the first pertinent basis value 68 while the multiplexer 66 outputs the second pertinent basis value 70, as described hereinabove.

The first and second basis vector values 68 and 70 are input to a 2-by-1 multiplexer 72, where the two values 68 and 70 are multiplied by a plurality of stored detector vector values 74 provided by a ROM 76. The resulting products 78 are then summed with its respective (negative) scale factor 80 from ROM 82 at multiple accumulator 84, which sum 86 is thereafter stored in a RAM 88. The sum stored in RAM 88 is then compared to a predetermined threshold value at block 90 to determine if deployment of the air bag should be triggered. If the threshold is exceeded, the block 90 outputs a trigger signal 41 to trigger deployment of the air bag.

While the preferred embodiment of the invention has been disclosed, it should be appreciated that the invention is susceptible of modification without departing from the spirit of the invention or the scope of the subjoined claims. For example, the signal space discriminator may comprise a neural network.

We claim:

1. In a motor vehicle, a system for triggering a safety device comprising:
    a sensor mounted in said vehicle for generating an analog signal representative of instantaneous vehicle acceleration (deceleration);
    means for converting said analog signal to digital acceleration data;
    means for transforming said acceleration data to a signal space vector; and
    signal space discriminator means responsive to said signal space vector for triggering the safety device when a value calculated from said signal space vector exceeds a threshold value therefor.

2. The system of claim 1, wherein said means for transforming said acceleration data into said signal space vector includes:
    means for obtaining log values of said acceleration data; and
    means for determining an autocorrelation of said log values of said acceleration data.

3. The system of claim 2, wherein said means for obtaining said log values includes a ROM lookup table.

4. The system of claim 2, wherein said means for determining said autocorrelation includes a summation dependent on current sample time and lag.

5. The system of claim 2, wherein said means for transforming said acceleration data into a signal space vector includes means for calculating first and second basis vector values from said autocorrelation of said log values.

6. The system of claim 5, wherein said first basis vector value is a DC vector value.

7. The system of claim 5, wherein said second basis vector value is a slant-up vector value going from a negative value to a positive value.

8. The system of claim 2, wherein said means for transforming said log-correlation to said signal space value includes a match filter.

9. A method for triggering a safety device in a motor vehicle, said method comprising the steps of:
obtaining an analog signal representative of instantaneous vehicle acceleration (deceleration) from a sensor mounted in said vehicle;
converting said analog signal to digital data;
transforming said digital data to a signal space vector; and
triggering the safety device when a value calculated from said signal space vector exceeds a threshold value therefor.

10. The method of claim 9, wherein said step of transforming said digital data into a signal space vector includes the steps of:
obtaining log values of said digital data; and
determining an autocorrelation of said log values using a lag.

11. The method of claim 10, wherein said step of determining said autocorrelation includes a summation dependent on current sample time and lag.

12. The method of claim 9, wherein said signal space vector is defined in part by a DC vector value of said digital data.

13. The method of claim 9, wherein said signal space vector is defined in part by a slant-up vector value of said digital data going from a negative value to a positive value.

14. The method of claim 9, including the step of clipping said analog signal.

15. A method for triggering a safety device in a motor vehicle, said method comprising the steps of:
obtaining an analog signal representative of instantaneous vehicle acceleration (deceleration) from a sensor mounted in said vehicle;
converting said analog signal to digital data;
obtaining log values of said digital data;
determining an autocorrelation of said log values of said digital data using a lag;
calculating first and second basis vector values from said log-correlation;
obtaining a signal space vector from two pairs of said first and second basis vector values;
obtaining a detector vector corresponding to specific crash profiles;
calculating the value of the dot product of said signal space vector with said detector vector;
integrating successive values of said dot product of said signal space vector with said detector vector;
comparing each of said integrated dot products with a threshold value; and
triggering said safety device if said integrated dot product exceeds said threshold value.

16. The method of claim 15, wherein said step of determining said autocorrelation includes a summation dependent on current sample time and lag.

17. The method of claim 15, wherein said first basis vector value is a DC vector value.

18. The method of claim 15, wherein said second basis vector value is a slant-up vector value going from a negative value to a positive value.

19. The method of claim 15, including the step of clipping said analog signal.

* * * * *